Jan. 29, 1924. 1,481,901
C. H. HAPGOOD
PROCESS AND APPARATUS FOR DISCHARGING UNCONTAMINATED WATER
FROM THE BILGE OR BALLAST TANK
Filed Sept. 12, 1923 2 Sheets-Sheet 2

WITNESS:

INVENTOR
Cyrus Howard Hapgood
BY
ATTORNEY

Patented Jan. 29, 1924.

1,481,901

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

PROCESS AND APPARATUS FOR DISCHARGING UNCONTAMINATED WATER FROM THE BILGE OR BALLAST TANK.

Application filed September 12, 1923. Serial No. 662,364.

*To all whom it may concern:*

Be it known that I, CYRUS HOWARD HAPGOOD, a citizen of the United States, residing at Nutley, county of Essex, and State of New Jersey, have invented a new and useful Improvement in Processes and Apparatus for Discharging Uncontaminated Water from the Bilge or Ballast Tank, of which the following is a full, clear, and exact description, reference being had to the accompanying drawings, which form a part of this specification.

Where the motive power of a ship is produced by fuel oil, it is necessary, as part of the ship's equipment, to provide fuel oil tanks which, when exhausted, are filled with sea-water, which acts as ballast. There is then, in these fuel oil tanks, both oil and water. The bilge-water of the ship also contains oil, most of which is lubricating oil, which drains from the turbines or engines and the auxiliary equipment. When a ship reaches port, it is not permissible, under statutory law and harbor regulations, to pump out this bilge and ballast water and run it into the harbor water, on account of the pollution that would result from the presence of oil in the discharged water. Consequently this oil-contaminated water is usually pumped into receiving tanks carried by lighters, which go out to sea and there discharge the polluting mixture.

This method of disposition is objectionable for several reasons. The discharged oil eventually finds its way to the coast and pollutes the shores. It involves considerable expense. It results in a loss of oil, which, if recovered, might be serviceable for lubrication, and which would be at least available for fuel.

The object of my invention is to separate out all the oil on board ship, so that the water can be pumped directly into the harbor water, thereby saving the expense of disposing of the water in the usual way, and incidently saving the oil, the proportion of which in the water varies from one-half of one per cent to five per cent. I am aware that efforts to accomplish this same end have been heretofore made, but I believe the process and apparatus hereinafter described are of superior efficiency and of certain operativeness, as they provide against factors obstructive of success which heretofore have been ignored or have not been adequately overcome.

The drawings show two embodiments of my apparatus invention, each illustrating a form of apparatus in which my generic process invention may be conveniently carried out, one of them being especially adapted to carry out my preferred process.

$a$ is the tank for ballast water or may represent the bilge; $b$ a pipe line leading therefrom in which is interposed a pump $c$ arranged to operate at a constant speed and a control valve $d$, the pump being between the tank and the control valve and operating the latter, as hereinafter described, by pressure and not by suction, this being a necessary feature of the invention, for reasons hereinafter pointed out.

The pipe $b$ extends up to any convenient discharge level and has a downwardly turned end which extends into a vertical conduit $e$, which communicates at its lower end with a vertical conduit $f$, the conduits affording two balanced columns of liquid acting (if necessary) as a separator, as hereinafter described. $g$ is an overflow pipe from column $e$. $h$ is an overflow pipe from column $f$.

A relief valve $i$ is interposed in the pipe line between pump $c$ and control volve $d$. From the relief valve extends a pipe $j$ which, like pipe $g$, discharges into a receiving tank $k$ provided with a heating coil $m$. The tank $k$ discharges into a centrifugal oil purifier $n$, the water discharge $o$ from which is connected to the bilge, while the oil discharge connects with a pipe $p$ leading to a lubricating oil receiver and with a pipe $q$ leading to a fuel oil receiver, the passage for the oil being governed by a three-way valve $r$.

A pipe $s$ connects the pipe $b$, beyond the control valve, with the ballast tank or bilge, a three-way valve $t$ being placed at the junction of the two pipes. The upper part of pipe $b$ is preferably provided with a vent $u$.

Figure 2:
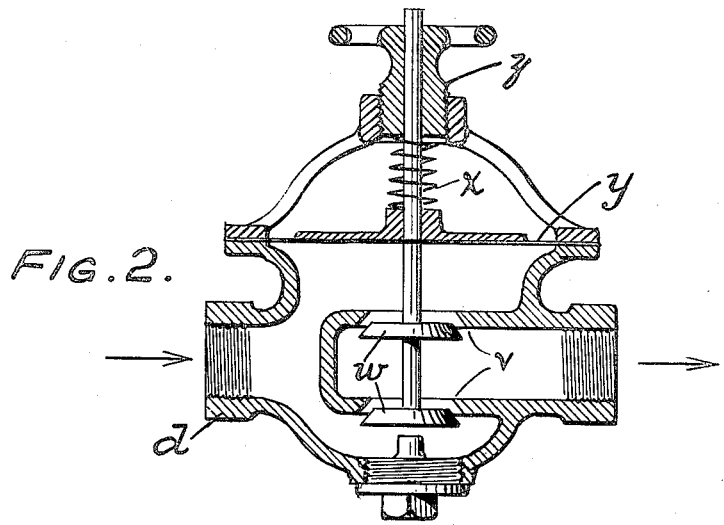
Fig. 2 is a sectional elevation of a typical control valve, for which any standard form of pressure regulator may be substituted and embodied in the apparatus.

The details of the control valve $d$ (which is a well known type of pressure regulator and forms per se no part of my invention) are shown in Fig. 2. The valve casing has a double seat $v$ engageable by valve disc $w$, which are normally held open by means of a spring $x$. The spring, which is of the compression type, is confined between the head of the valve casing and a diaphragm $y$. The pressure of the spring is regulated by the hand-turnable nut $z$.

The operation of the apparatus described is as follows:

By reason of gravity, the oil in tank $a$ floats to the top. When the pump is first operated, and until the tank is fairly well drained, nothing but water is pumped through the pipe $b$, which water is discharged from the pipe $b$ into the separator $e$—$f$, or directly into the harbor water. The spring $x$ of the control valve is so adjusted that as long as the resistance to flow through the pipe line beyond the pump remains constant, the valve discs $w$ will remain fully open. As long as nothing but water is pumped through the pipe line, this resistance remains constant. However, as soon as the measurable proportion of oil begins to come through with the water, there is an increased resistance to flow due to the viscosity of oil being much greater than that of water. Hence the pressure against diagram $y$ of the control valve increases, compressing the spring $x$. This moves the valve discs, toward their seats. Once the control valve is throttled, resistance to flow still further increases and the pressure against the valve increases, insuring its complete closure.

As soon as the control valve starts to throttle, the relief valve $i$ starts to open, and soon all the liquid pumped from tank $a$ is passing through pipe $j$ into the receiving tank $k$. This continues until the tank $a$ is emptied.

The liquid entering receiver $k$ is of course a mixture of oil and water. In this receiver, the mixture is heated and flows into the centrifugal purifier $n$, wherein the oil is separated from the water. The water is returned to the bilge, while the oil (dependent upon its character and quality) is led either to a lubricating oil tank or to a fuel oil tank.

The control valve does not fully close until a small volume of a mixture of oil and water has passed into the lower part of the pipe $b$. After the relief valve opens, and the mixture of oil and water is pumped to the oil receiving tank $k$, it may be desirable to adjust the spring pressure of the control valve so as to allow the control valve to open, turn valve $t$ to establish communication between pipe $b$ and pipe $s$, and pump the small volume of mixture in pipe $b$ below valve $t$ into another tank $a$, thus being the next tank to be cleaned. The clear water for flushing the pipe $b$ will come from the bottom of this tank. It is understood that all the fuel or ballast tanks have valve connections to inlet and discharge manifolds.

So far as the operation of the apparatus has been described, the separator $e$—$f$ might as well be omitted, as nothing but water will ever pass into it. Indeed, the amount of oil that will ever pass the control valve, if its spring is set to constant normal pressure, is so small that it would not be objectionable to at all times discharge the water from the pipe line direct into the harbor water. The separator $e$—$f$ may, in fact, be omitted, but its provision is desirable, in that its presence insures against the discharge of any oil through the pipe $b$ if, through carelessness, or by reason of some defective adjustment or operation of the control valve, the mechanism whose operation has been heretofore described should not operate satisfactorily. The separator $e$—$f$ is not per se novel, and no claim is made for it except in combination with the remainder of the apparatus.

It will be understood that if any oil passes into conduit $e$, this oil will not flow into conduit $f$, but will separate, by gravity, and pass into the top of conduit $e$, above the immersed outlet end of pipe $b$. In this conduit, the top layer of oil builds up until it overflows through pipe $g$. As long as there is no oil in the separator, there will be no overflow at $g$, because the weight of the two columns will balance only when they are of equal heights, and the water overflow $h$ is below the overflow $g$. With oil in the separator, however, column $e$ will be higher than column $f$, due to the lower density of the oil, and there will be no overflow at $g$ until there is a substantial accumulation of oil in column $a$. The difference in levels of the two overflows need be, however, but small, in order to insure against the outflow of water at $g$.

As hereinbefore stated, the location of the pump $c$ on the pressure side of the control valve is of importance, because, by so locating the pump, it will work against a constant head, measured by the height of the pipe $b$ up to the bottom of vent $u$. If the vent be omitted, the head will be measured by the height of the pipe $b$ up to the level of the water in the column. This head being constant, the pressure against the diaphragm of the control valve can vary only according to variation in resistance to flow through pipe $b$ beyond the pump, and there is no factor capable of affecting this resistance except variation in viscosity of the liquid.

If the control valve were located on the suction side of the pump, the diaphragm would necessarily be arranged to be responsive to the suction of the pump. This suction would, of course, increase with increase of resistance to flow; but the diaphragm is also in open communication with the tank and the fall of the level of the liquid in the tank is a factor that would also increase the suction on the diaphragm. Hence the control valve would start to close before the oil level would be reached, which would still further increase the suction and cause a premature closing of the control valve.

In my apparatus, however, as above stated, the variation in the head of liquid in the tank does not affect the pressure in the pipe line beyond the pump, the only factor affecting the operation of the control valve being a variation in the viscosity of the flowing stream of liquid.

Figure 1:
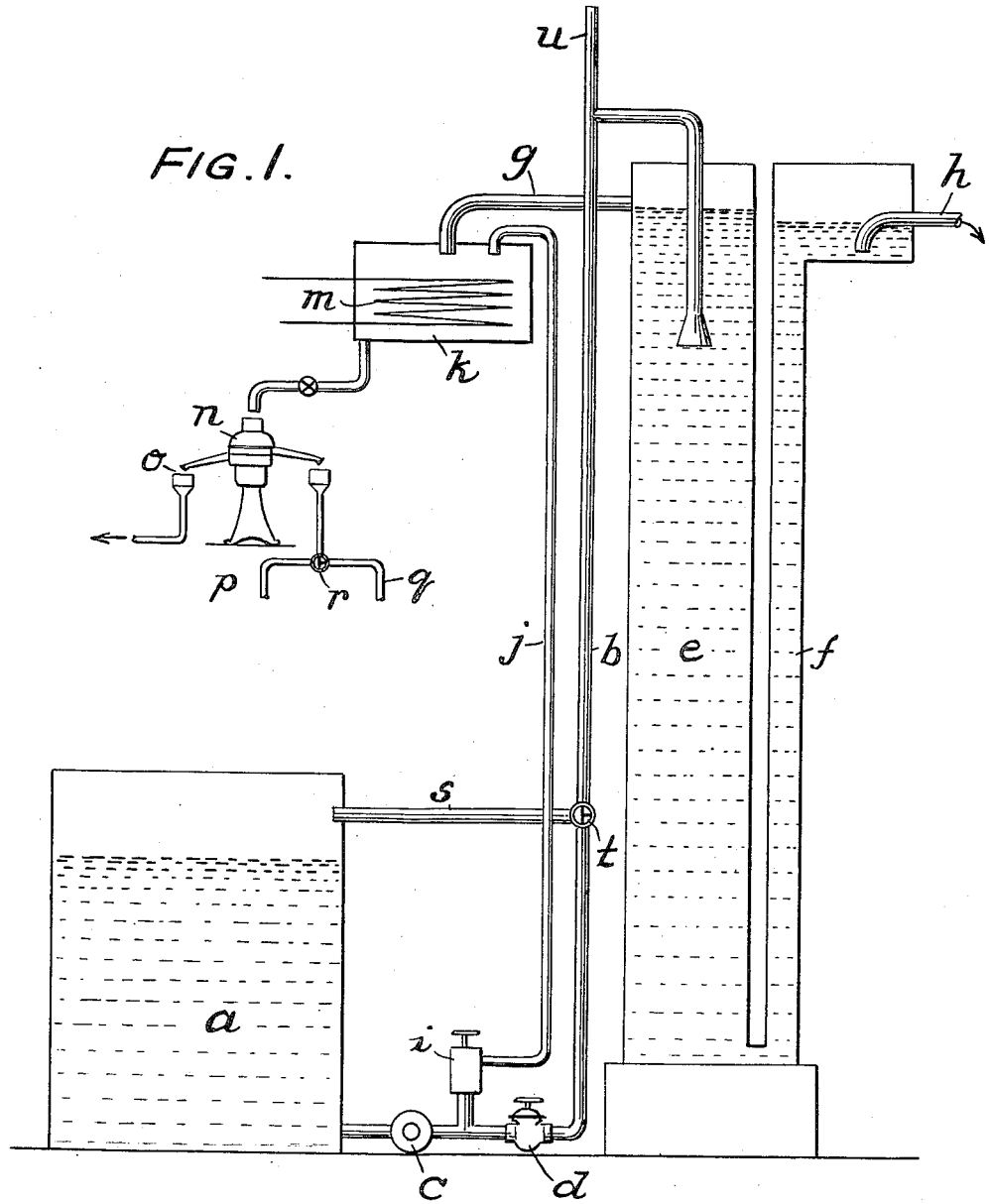
Fig. 1 is a sectional elevation, somewhat diagrammatic, showing one apparatus.
Figure 3:
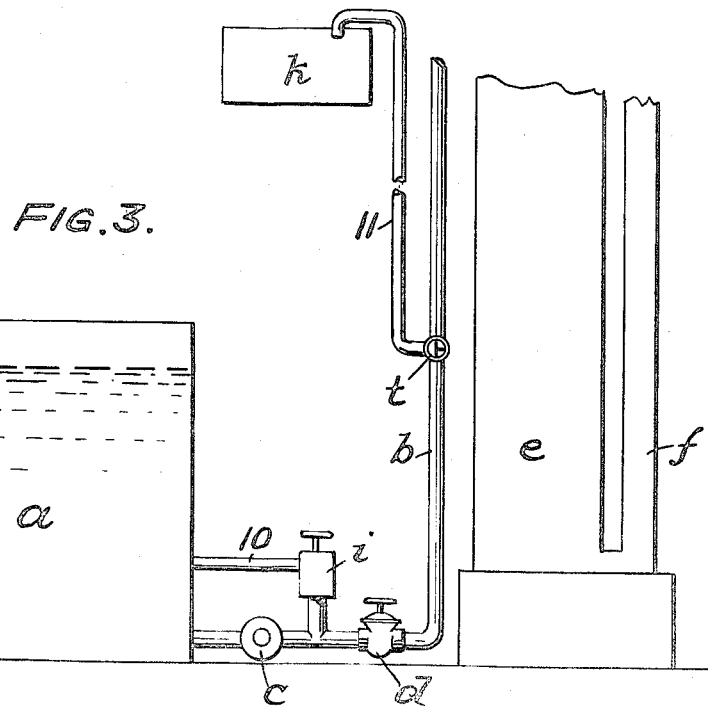
Fig. 3 is a sectional elevation, somewhat diagrammatic. of a less preferred, but satisfactorily workable, apparatus.

A permissible substitute apparatus is shown in Fig. 3. The same reference letters are retained where they apply to the same parts. In this apparatus, the pipe 10 from the relief valve $i$ returns to the tank $a$, while the pipe 11 branching from pipe $b$ extends to the oil receiver $k$. As soon as the control valve $d$ closes, oil circulates from the tank $a$ through the pump $c$, relief valve $i$ and pipe 10 back to tank $a$. The pump is then stopped, the control valve is opened, and the cock $t$ is turned to connect pipe $b$ with pipe 11 and the oil is pumped to the oil receiver $k$. In the apparatus shown in Fig. 1, however, when the control valve closes due to the presence of oil in the pipe line beyond the control valve and the relief valve opens, the oil is pumped from tank $a$ directly to the oil receiver $k$, without the necessity of stopping the pump and opening the control valve, thereby dispensing with the necessity of attention on the part of the operator.

While the invention is especially applicable to the purpose described, it is clear that it is also applicable to any situation requiring the pumping of water out of a tank and the automatic separation out of oil or grease contained in the water.

An example of such a situation is the case of field tanks in the oil fields. In these tanks water settles by gravity and is removed before delivering the oil, which must conform to standard specifications, to the pipe lines. By the use of my system, the water, after settlement, may be pumped out and flow of oil from the tank will be arrested automatically.

The invention is also applicable to a variety of uses other than those above described, of which the following is an example. In the manufacture of tallow, after the bones and scrap have been sufficiently cooked, the contents of the rendering tank consist of undissolved solids at the bottom, stick-water (from which glue is made) in the center and tallow at the top. The level of the bottom of the tallow is determined by the try-cocks as the stick-water is pumped out to the stick-water evaporator, and when tallow appears at the lowest try-cock the pump is shut down, the valves in the discharge pipes changed and the tallow, with some water, is pumped to the tallow tank. The water is subsequently drained from the bottom of the tallow tank. By the use of my invention, however, the pumping down of these rendering tanks could be done automatically and without carrying any appreciable quantity of stick-water over with the tallow.

It is therefore to be understood that while, for convenience of nomenclature, I have "specified" in the claims "oil-contaminated water", "oil-free water", etc., I intend to cover all the uses of which the process and apparatus are capable, and that references to water and oil are intended to include other liquids which, so far as my invention are concerned, are equivalents, such as, for example, stick-water and tallow; the stick-water being the heavier and less viscous liquid and the tallow being the lighter and more viscous liquid. While oil is referred to as a "contaminated" ingredient of bilge or ballast water and is such from one point of view (although, when separated out, it is the only constituent of value), it will be understood that the term as used is not intended to exclude cases where the heavier liquid might more accurately be said to contaminate the lighter liquid and also to cases where the lighter and more viscous liquid is present in larger proportion than the heavier and less viscous liquid.

For certain purposes, or in certain circumstances, the apparatus is capable of use where it is not possible (as, for instance, where there is no substantial difference in the viscosities of the liquids), or not desirable, to rely upon the control valve to automatically shut off the flow of liquid toward the gravity separator. In such cases, the control valve may be held open during the outflow of the heavier liquid, and after the heavier liquid has been pumped out of the reservoir (which can be determined as described in connection with the description of the application of the invention to the separation of stick-water and tallow), the necessary valve adjustments may be made to connect the reservoir with the receiving tank $k$ leading to the centrifugal separator. Alternatively, the entire contents of the reservoir may be pumped to the gravity separator. In either case, the lighter material that separates out by gravity in the separator $e$—$f$ flows into the receiving tank $k$ and may be thence fed to the centrifugal separator, wherein any heavy liquid that overflows with the lighter liquid may be removed.

Having now fully described my inven- tion, what I claim and desire to protect by Letters Patent is:

1. The process of emptying reservoirs containing oil-contaminated water and discharging oil-free water, which comprises pumping out the liquid against a constant head, utilizing the pump pressure to arrest the outflow of liquid toward the discharge, opposing the pump pressure by a force adapted to overcome said pressure and maintain open the flow to the discharge during the outflow of water, and adjusting said force so that, upon increase of pump pressure due to outflow of oil and consequent increase in viscosity of the liquid, said force will be overcome by the pump pressure and the outflow toward the discharge arrested.

2. The process of emptying reservoirs containing oil-contaminated water and discharging oil-free water, which comprises pumping out the liquid against a constant head, utilizing the pump pressure to arrest the outflow of liquid toward the discharge, opposing the pump pressure by a force adapted to overcome said pressure and maintain open the flow to the discharge during the outflow of water, adjusting said force so that, upon increase of pump pressure due to outflow of oil and consequent increase in viscosity of the liquid, said force will be overcome by the pump pressure and the outflow toward the discharge arrested, diverting a mixture of water and oil from the column of liquid between the pump and the water discharge after the outflow toward the water discharge has been so arrested, and centrifugally separating the constituents of the mixture.

3. The process of emptying reservoirs containing oil-contaminated water and discharging oil-free water, which comprises pumping out the liquid against a constant head, utilizing the pump pressure to arrest the outflow of liquid toward the discharge, opposing the pump pressure by a force adapted to overcome said pressure and maintain open the flow to the discharge during the outflow of water, adjusting said force so that, upon increase of pump pressure due to outflow of oil and consequent increase in viscosity of the liquid, said force will be overcome by the pump pressure and the outflow toward the discharge arrested, and automatically diverting away from the pipe line the liquid that continues to be pumped and centrifugally separating the oil and water in the mixture so diverted.

4. The process of emptying reservoirs containing oil-contaminated water and discharging oil-free water, which comprises pumping out the liquid against a constant head, utilizing the pump pressure to arrest the outflow of liquid toward the discharge, opposing the pump pressure by a force adapted to overcome said pressure and maintain open the flow to the discharge during the outflow of water, adjusting said force so that, upon increase of pump pressure due to outflow of oil and consequent increase in viscosity of the liquid, said force will be overcome by the pump pressure and the outflow toward the discharge arrested, and separating out by gravity oil that has passed the point of arrest and is subsequently discharged with the water.

5. In an apparatus for emptying reservoirs containing oil-contaminated water and discharging oil-free water, the combination with a reservoir for the oil-contaminated water, a pipe line leading therefrom and extending toward a discharge, said pipe line, when filled with water, providing a fixed head, a control valve in the pipe line, a pump between the reservoir and the control valve, and means, responsive to increase in pump pressure due to increase in the viscosity of the flowing liquid, adapted to close said valve, thereby closing the pipe line after oil begins to flow therethrough.

6. In an apparatus for emptying reservoirs containing oil-contaminated water and discharging oil-free water, the combination with a reservoir for the oil-contaminated water, a pipe line leading therefrom and extending toward a discharge, said pipe line, when filled with water, providing a fixed head, a control valve in the pipe line, a pump between the reservoir and the control valve, means, responsive to increase in pump pressure due to increase in the viscosity of the flowing liquid, adapted to close said valve, and a relief valve between the pump and the control valve adapted to open when the flow past the control valve is obstructed.

7. In an apparatus for emptying reservoirs containing oil-contaminated water and discharging oil-free water, the combination with a reservoir for the oil-contaminated water, a pipe line leading therefrom and extending toward a discharge, said pipe line, when filled with water, providing a fixed head, a control valve in the pipe line, a pump between the reservoir and the control valve, means, responsive to increase in pump pressure due to increase in the viscosity of the flowing liquid, adapted to close said valve, a centrifugal oil and water separator, and a pipe connecting the pipe line with said separator.

8. In an apparatus for emptying reservoirs containing oil-contaminated water and discharging oil-free water, the combination with a reservoir for the oil-contaminated water, a pipe line leading therefrom and extending toward a discharge, said pipe line, when filled with water, providing a fixed head, a control valve in the pipe line, a pump between the reservoir and the control valve, means, responsive to increase in pump pressure due to increase in the viscosity of the flowing liquid, adapted to close said valve, a centrifugal oil and water separator, a pipe connecting the pipe line with said separator, and a valve between the pipe line and said pipe adapted to be opened to allow the pump to force the liquid in the reservoir to the separator.

9. In an apparatus for emptying reservoirs containing oil-contaminated water and discharging oil-free water, the combination with a reservoir for the oil-contaminated water, a pipe line leading therefrom and extending toward a dicharge, said pipe line, when filled with water, providing a fixed head, a control valve in the pipe line, a pump between the reservoir and the control valve, means, responsive to increase in pump presure due to increase in the viscosity of the flowing liquid, adapted to close said valve, an oil and water separator, an automatic relief valve in the pipe line between the pump nd the control valve, and a pipe connecting the relief valve with the separator.

10. In an apparatus for emptying reservoirs containing oil-contaminated water and discharging oil-free water, the combination with a reservoir for the oil-contaminated water, a pipe line leading therefrom, said pipe line, when filled with water, providing a fixed head, a control valve in the pipe line, a pump between the reservoir and the control valve, means, responsive to increase in pump pressure due to increase in the viscosity of the flowing liquid, adapted to close said valve, and an oil and water gravity separator connected with the pipe line.

11. In an apparatus for emptying reservoirs containing oil-contaminated water and discharging oil-free water, the combination with a reservoir for the oil-contaminated water, a pipe line leading therefrom, a gravity separator connected with the pipe line, said pipe line, when filled with water, providing a fixed head, a control valve in the pipe line, a pump between the reservoir and the control valve, means, responsive to increase in pump pressure due to increase in the viscosity of the flowing liquid, adapted to close said valve, said gravity separator comprising two vertical conduits connected at their bottom portions, the pipe line opening into one column, there being an oil overflow from said column and a water overflow, at a lower level than the oil overflow, from the second column.

12. In an apparatus for emptying reservoirs containing oil-contaminated water and discharging oil-free water, the combination with a reservoir for the oil-contaminated water, a pipe line leading therefrom and extending toward a discharge, said pipe line, when filled with water, providing a fixed head, a control valve in the pipe line, a pump between the reservoir and the control valve, means, responsive to increase in pump pressure due to increase in the viscosity of the flowing liquid, adapted to close said valve, an oil and water separator, an automatic relief valve in the pipe line between the pump and the control valve, a pipe connecting the relief valve with the separator, a pipe leading to the reservoir from the pipe line at a point between the control valve and the discharge, and a valve controlling the flow from the pipe line into said pipe.

13. In an apparatus for emptying reservoirs containing oil-contaminated water and discharging oil-free water, the combination with a reservoir for the oil-contaminated water, a pipe line leading therefrom, said pipe line, when filled with water, providing a fixed head, a control valve in the pipe line, a pump between the reservoir and the control valve, means responsive to increase in pump pressure due to increase in the viscosity of the flowing liquid, adapted to close said valve, a gravity oil and water separator connected with the discharge end of the pipe line, a centrifugal oil and water separator, and a pipe connecting the latter with the valve-controlled pipe line at a point between the pump and the gravity separator.

14. In an apparatus for emptying reservoirs containing oil-contaminated water and discharging oil-free water, the combination with a reservoir for the oil-contaminated water, a pipe line leading therefrom, said pipe line, when filled with water, providing a fixed head, a control valve in the pipe line, a pump between the reservoir and the control valve, means, responsive to increase in pump pressure due to increase in the viscosity of the flowing liquid, adapted to close said valve, a gravity oil and water separator connected with the discharge end of the pipe line, a centrifugal oil and water separator, a relief valve between the pump and the control valve, and a pipe connection from the relief valve to the centrifugal separator.

15. In an apparatus for emptying reservoirs containing oil-contaminated water and discharging oil-free water, the combination with a reservoir for the oil-contaminated water, a pipe line leading therefrom, a pump interposed in the pipe line, a gravity separator connected with the discharge end of the pipe line, a centrifugal separator connected with the pipe line, and means to direct the flowing liquid to either separator.

16. In an apparatus for emptying reservoirs containing oil-contaminated water and discharging oil-free water, the combination with a reservoir for the oil-contaminated water, a pipe line leading therefrom, a pump interposed in the pipe line, a gravity separator connected with the discharge end of the pipe line, a centrifugal separator connected with the pipe line, means to direct the flowing liquid to either separator, the lighter liquid being adapted to overflow from the gravity separator, and means providing a passage for the overflowing lighter liquid to the centrifugal separator.

In testimony of which invention, I have hereunto set my hand, at New York, on this 7th day of September, 1923.

CYRUS HOWARD HAPGOOD.

Witnesses:
R. R. WARREN,
GEO. D. TALLMAN.